United States Patent [19]
Griffey

[11] 3,908,159
[45] Sept. 23, 1975

[54] REGULATED POWER SUPPLY WITH START-UP AND PROTECTIVE CIRCUITS

[75] Inventor: Donald E. Griffey, Skokie, Ill.

[73] Assignee: Quasar Electronics Corporation, Franklin Park, Ill.

[22] Filed: June 3, 1974

[21] Appl. No.: 475,566

[52] U.S. Cl. ............. 321/11; 178/DIG. 11; 317/31; 321/14; 321/18; 323/22 SC
[51] Int. Cl.² .................... H02P 13/26; H02H 7/127
[58] Field of Search .............................. 321/11–14, 321/18, 19, 27 R, 45 S, 47; 323/22 SC, 8; 178/11; 317/31; 328/259, 267; 315/240, 20, 22; 325/362

[56] References Cited
UNITED STATES PATENTS

| | | | |
|---|---|---|---|
| 3,300,704 | 1/1967 | McMillen | 321/18 |
| 3,437,905 | 4/1969 | Healey et al. | 321/19 |
| 3,562,621 | 2/1971 | Schaefer | 321/18 |

FOREIGN PATENTS OR APPLICATIONS

| | | | |
|---|---|---|---|
| 1,123,010 | 8/1968 | United Kingdom | 321/18 |
| 1,214,313 | 12/1970 | United Kingdom | 321/47 |

OTHER PUBLICATIONS

IBM Technical Disclosure Bulletin, Vol. 10, No. 8, pp. 1212, 1213, Jan. 1968.

IBM Technical Disclosure Bulletin, Vol. 6, No. 12, pp. 11, 12, May 1964.

Primary Examiner—William H. Beha, Jr.
Attorney, Agent, or Firm—LaValle D. Ptak

[57] ABSTRACT

A regulated silicon-controlled rectifier power supply for producing the direct current power for a television receiver is disclosed. The power supply is regulated by a shunt regulator, and the firing of the silicon-controlled rectifiers is controlled by a diac and timing capacitor coupled with the output of the shunt regulator. Spurious operation of the diac is prevented by a trigger clamp circuit which is reset at the beginning of each half-cycle of the input alternating current waveform to permit the diac to fire once during each half-cycle to initiate conduction of the appropriate silicon-controlled rectifier. In addition, a provision is made for insuring initial start-up of the operation of the power supply by use of an auxiliary power supply effective when the alternating current input signal first is applied to the system. Finally, a protective circuit is provided to shut down the power supply circuit in the event of an overvoltage condition.

21 Claims, 1 Drawing Figure

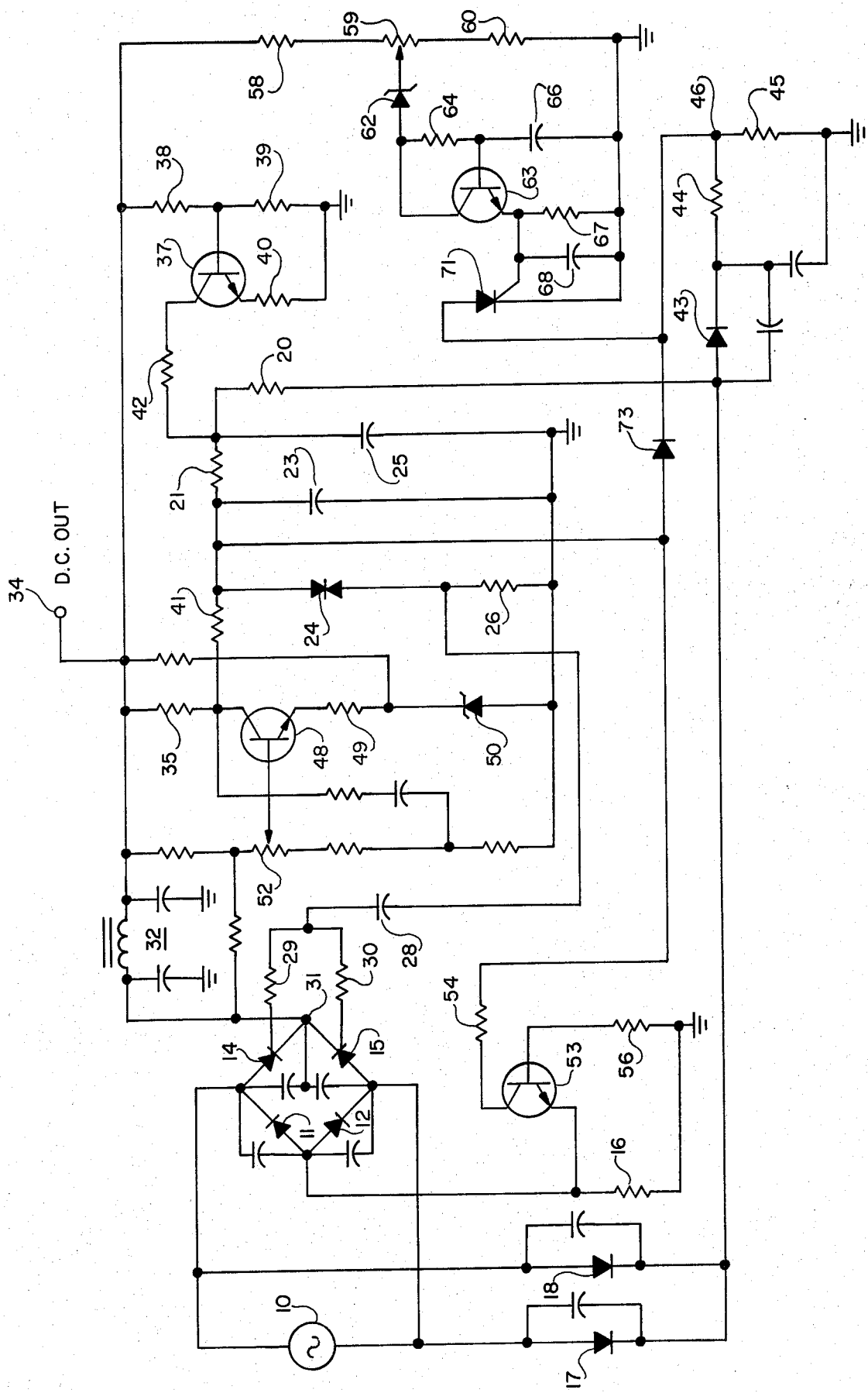

REGULATED POWER SUPPLY WITH START-UP AND PROTECTIVE CIRCUITS

BACKGROUND OF THE INVENTION

Television receivers generally operate from alternating current line voltages and use rectifier circuits to produce the direct current voltages necessary for operation of the receiver. Such direct current voltages must be regulated fairly closely since failure to properly regulate these voltages can result in damage to circuit components of the receiver and also can result in hazardous radiation from the receiver if the direct current operating voltages exceed some maximum safe level. Thus, it is necessary to be able to control the output voltage produced by the rectifier circuit. Silicon-controlled rectifiers are commonly employed as part of the rectifier circuit, for this purpose, and the firing angle of the silicon-controlled rectifiers is varied in accordance with the sensed output voltage to maintain the output voltage regulated fairly closely about the proper operating voltage.

Relatively complex trigger circuits are employed for controlling the firing of the silicon-controlled rectifiers, and it is desirable to simplify such trigger circuits as much as possible to reduce the expense of the power supply circuit. In addition, it is desirable to make the trigger circuits as reliable as possible. Also some provision should be made for responding to an overvoltage condition caused by failures of any type to reduce the output voltage of the rectifier circuit to a safe level or to shut down the operation of the rectifier circuit until the cause of the overvoltage condition is corrected. It is desirable that such a protective circuit be effective to accomplish the desired result, but at the same time be as simple as possible to minimize the expense of incorporation of the protective circuit into the power supply.

SUMMARY OF THE INVENTION

Accordingly, it is an object of this invention to provide an improved power supply for producing a direct current output from an alternating current input.

It is another object of this invention to provide an improved regulated power supply for television receivers.

It is a further object of this invention to provide a regulated power supply using silicon-controlled rectifiers with an improved circuit for controlling the firing angle of such silicon-controlled rectifiers.

It is an additional object of this invention to provide overvoltage protection for a power supply circuit using static latching switches for producing a direct current voltage from an alternating current input.

It is still another object of this invention to provide a start-up circuit for initiating operation of a silicon-controlled rectifier power supply circuit.

In accordance with a preferred embodiment of this invention, a regulated power supply for producing a direct current voltage in response to an alternating current input utilizes gated unidirectional conductive devices operated in response to a gating signal and coupled to receive alternating current signals to produce direct current signals on an output terminal. A regulator is coupled with the output terminal for regulating a magnitude of the output voltage appearing thereon. A timing control circuit is coupled with the output terminal and produces a time varying voltage applied to a voltage responsive switch which produces a gating pulse for the unidirectional conductive devices in response to a voltage attained by the timing control circuit. A clamping device senses the flow of current through the gated unidirectional conductive devices to prevent spurious operation of the voltage responsive switch once it has supplied a gating pulse to the gated unidirectional conductive devices.

In more specific embodiments, an auxiliary power supply is coupled with the timing control circuit to assure operation of the power supply when alternating current first is applied to it. In another specific embodiment an overvoltage protection circuit is coupled to respond to the direct current voltage on the output terminal of the unidirectional conductive devices; and when this voltage exceeds some maximum amount, the protection circuit operates to shut down the power supply by preventing the timing control circuit from attaining a voltage level sufficient to trigger the voltage responsive switch into operation.

BRIEF DESCRIPTION OF THE DRAWING

The sole FIGURE of the drawing is a schematic diagram of a preferred embodiment of the invention.

DETAILED DESCRIPTION

Referring now to the FIGURE, there is shown a regulated power supply circuit for producing a direct current voltage suitable for use as the B+ operating potential of a television receiver from a suitable source 10 of alternating current input signals, which may be ordinary household 60 hertz alternating current. When alternating current first is applied from the source 10, such as by turning on an on/off switch or by plugging in the line cord of the receiver with which power supply is used, an auxiliary rectifier circuit initially is effective to insure start-up of operation of the main silicon-controlled rectifier power supply.

As shown in the drawing, the main silicon-controlled rectifier power supply comprises a conventional full-wave rectifier bridge, with a pair of diodes 11 and 12 and a pair of static latching switches in the form of silicon-controlled rectifiers (SCR's) 14 and 15 forming the four arms of the bridge, respectively. The alternating current input signals are applied across the junction of the cathode of the diode 11 with the anode of the SCR 14, and the junction of the cathode of diode 12 with the anode of the SCR 15. The direct current output voltage appears across the output terminals which are respectively coupled to the junction of the anodes of the diodes 11 and 12 and the cathodes of the SCR's 14 and 15.

As is well known, the SCR's 14 and 15 will not conduct until a trigger or gate pulse is applied to the gate of whichever one of the SCR's 14 or 15 has a forward potential applied across its anode-cathode path from the alternating current source at the time the gate pulse is applied. Thus, initially neither of the SCR's 14 and 15 conducts.

To insure that the system will initially start operation, an auxiliary rectifier circuit is provided in the form of a full-wave bridge rectifier in which the diodes 11 and 12 are connected in two arms of the bridge and a second pair of diodes 17 and 18 are connected in the other two arms of the bridge. The diodes 11 and 12 thus are parts of both the auxiliary rectifier bridge and the main power supply bridge. The junction of the anodes of these diodes is connected to ground through a resistor 16.

Since the auxiliary rectifier bridge consisting of the diodes 11, 12, 17 and 18 is a conventional diode bridge, it immediately produces a direct current voltage at the junction of the cathodes of the diodes 17 and 18. The auxiliary direct current voltage supply is connected through a pair of relatively large value resistors 20 and 21 to the upper terminal of a timing capacitor 23, the other terminal of which is connected to ground, to provide an initial charging path for the capacitor 23. An electrolytic filter capacitor 25 is used to remove ripple from the current supplied to the capacitor 23.

A diac 24 and a resistor 26 are connected in parallel across the capacitor 23. When the voltage on the capacitor 23 exceeds the firing or avalanche breakdown voltage of the diac 24 (approximately 30 volts) the diac 24 breaks down or fires; and a current surge flows through the resistor 26. This produces a positive-going trigger pulse which is applied through a coupling capacitor 28 and respective resistors 29 and 30 to the gates of the SCR's 14 and 15.

The SCR 14 has a positive potential applied across its anode-cathode path for one-half of each cycle of the alternating current input signal, and the SCR 15 has a positive potential applied across its anode-cathode path for the opposite half cycles of the input signal waveform. The SCR 14 or 15 which has a positive anode-cathode potential applied to it at the time a gate pulse is applied through the capacitor 28 then is rendered conductive to supply an output voltage on the output terminal 31 of the rectifier bridge. This terminal is coupled through a filter circuit 32 to produce the DC output appearing on an output terminal 34.

The diac 24 continues to conduct to discharge the capacitor 23 until the voltage drops to a level insufficient to maintain conduction of the diac, whereupon the diac 24 again becomes nonconductive. When the diac becomes nonconductive, the capacitor 23 is allowed to resume charging, this time being charged both from the auxiliary power supply and through a resistor 35 from the voltage applied by the main SCR rectifier power supply circuit to the DC output terminal 34, until a trigger clamp (described subsequently) operates.

Upon conclusion of the first half-cycle of operation of the SCR rectifier circuit, the one of the SCR's 14 and 15 which was conductive becomes nonconductive due to the reversal of the current applied to it. The other of the SCR's 14 and 15, however, then has a forward potential applied across its anode-cathode path for the opposite or second half-cycle of the input signal. When the diac 24 next fires, the other SCR fires and the power supply circuit operates in a known manner to continue the application of rectified pulses to the terminal 31 and through the filter 32 to the output terminal 34.

It should be noted that the capacitor 23 initially was charged by the auxiliary rectifier including the diodes 17 and 18. To assure that the capacitor 23 is not provided with charging current from both the output terminal 34 and the auxiliary rectifier at a rate which prevents the voltage on the capacitor 23 from dropping below the cutoff voltage of the diac 24, it is necessary to reduce the effect of the auxiliary power supply diodes 17 and 18 once proper operation of the main silicon-controlled rectifier circuit has been initiated. This is accomplished by an NPN power shift transistor 37, the base of which is connected to a tap on a voltage divider comprising a pair of resistors 38 and 39 connected in series between the terminal 34 and ground. The emitter of the transistor 37 is connected to ground through an emitter resistor 40.

When the voltage on the output terminal 34 rises to near the desired final output voltage, the transistor 37 becomes forward-biased into conduction. This then connects a relatively large value resistor 42 in shunt across the capacitor 23 and the electrolitic filter capacitor 25 to substantially load down the output of the auxiliary rectifier diodes 17 and 18, reducing the charging current supplied by the auxiliary power supply to the capacitor 23. The resistor 21 isolates this portion of the circuit from the main charging path for the capacitor 23 which now is through the resistor 35 and a resistor 41 from the DC output terminal 34 of the main power supply rectifier circuit. The auxiliary power supply continues to supply direct current through an isolating diode 43 and a pair of resistors 44 and 45 to ground to cause a positive voltage to appear on a terminal 46.

Once the effect of the auxiliary power supply on the charging of the timing capacitor 23 has been reduced, the voltage appearing on the output terminal 34 can be regulated by a shunt regulator circuit of conventional configuration. This regulator employs an NPN transistor 48 the collector of which is connected to the output terminal 34 through the resistor 35 and the emitter of which is connected through an emitter resistor 49 and a Zener diode 50 to ground. The base of the transistor 48 is coupled to a tap on a potentiometer 52 which is part of a voltage divider connected between the output terminal 34 and ground. Thus, the regulation point of the transistor 48 can be adjusted by movement of the tap of the potentiometer 52 to vary the point at which the transistor 48 becomes conductive to shunt voltage from the output terminal 34.

The collector of the transistor 48 also is connected to the junction of the resistors 35 and 41. Thus, as the conductivity of the transistor 48 varies, it also varies the rate at which the timing capacitor 23 is charged, thereby effecting the desired control.

If the auxiliary power supply were not rendered minimally effective by the operation of the transistor 37, it would be possible for the auxiliary power supply to dominate the charging of the capacitor 23 to such an extent that the shunt regulator transistor 48 would be ineffective to control the operation of system. Thus, it is important to reduce the effect of the auxiliary power supply as described previously.

Even though the effect of the auxiliary power supply has been reduced, firing of the diac 24 still can be erratic, resulting in uneven operation of the SCR's 14 and 15. To prevent such erratic firing, a trigger clamp NPN transistor 53 is connected through a coupling resistor 54 to the junction of the diac 24 and the timing capacitor 23. The base of the transistor 53 is connected through a coupling resistor 56 to ground and the emitter is connected to the junction of the anodes of the diodes 11 and 12 with the resistor 16. The transistor 53 thus operates to sense the conduction of the SCR's 14 and 15.

If both of the SCR's 14 and 15 are nonconductive, the transistor 53 is nonconductive since the potential on its emitter and base are essentially the same. Whenever one or the other of the SCR's 14 or 15 conducts, however, the potential on the emitter of the transistor 53 goes more negative than the potential on its base. When this potential exceeds the forward base-emitter breakdown voltage of the transistor 53 (approximately 7/10ths volt), it conducts and clamps the upper end of the capacitor 23 to a potential or voltage established by the values of the resistors 54 and 16. In a circuit which has been operated, this clamped potential was approximately zero (0) volts, where 30 volts was required to fire the diac 24.

Thus, the diac 24 is prevented from firing and providing any additional output pulses and from further discharging the capacitor 23 below this clamped potential until the transistor 53 is rendered nonconductive. This occurs at the end of the half-cycle of the input waveform in which the transistor 53 became conductive, since at the end of that half-cycle the then conductive SCR 14 or 15 becomes non-conductive due to the reversal of the AC waveform across it. At this point, the capacitor 23 commences recharging from the output voltage present on the terminal 34, at a rate determined by that voltage, until the diac 24 next fires; and the cycle of operation is repeated. This insures that the diac 24 is fired only once in each half-cycle of the input signal and that the charge on the capacitor 23 is initiated from the same clamped level established by the transistor 53 for each half-cycle of operation.

If for some reason, the voltage on the output terminal 34 should exceed the desired safe level, it is necessary to reduce that level or damage to the television receiver components and hazardous radiation could result. In the circuit shown in the drawing, the main SCR rectifier supplying the direct current voltage to the terminal 34 is turned off and rendered completely inoperative upon the sensing of such an excess output voltage.

The output voltage is continuously monitored through a voltage divider comprising a resistor 58, a potentiometer 59 and a resistor 60 connected between the output terminal 34 and ground. The tap on the potentiometer 59 is coupled through a Zener diode 62 to the collector of an NPN overload sensing transistor 63 and through a resistor 64 to the base of the transistor 63, which also is coupled to ground through a capacitor 66. The emitter of the transistor 63 is coupled to ground through a resistor 67 and a capacitor 68 connected in parallel, and also is connected to the gate of an SCR 71, the cathode of which is connected to ground. The anode of the SCR 71 is connected through an isolating diode 73 to the junction of the capacitor 23 and diac 24.

Normally, the positive potential on the terminal 46 supplied by the auxiliary power supply reverse biases the diode 73 and it effectively operates as an open circuit; so that the overload protection circuit has no effect on the operation of the regulated power supply. In the event, however, that an excessive voltage is sensed by the overload protection circuit at the tap of the potentiometer 59, the Zener diode 62 breaks down and conducts a positive pulse to the base of the transistor 63, rendering it conductive. This causes a positive-going trigger pulse to be applied to the gate of the silicon-controlled rectifier 71 which goes into avalanche conduction, discharging the capacitor 23 through the now forward-biased diode 73 since the SCR couples near ground potential to the terminal 46.

When the capacitor 23 is discharged, the diac 24 no longer has a voltage applied across it which exceeds its avalanche breakdown or firing point; and no pulses are produced across the resistor 26. Thus, on the very next half-cycle of the input AC waveform, further conduction through the SCR's 14 and 15 ceases and the power supply is shut down.

To insure that this condition remains, the auxiliary power supply supplies current from the terminal 46 through the SCR 71, which remains conductive until power from the AC supply 10 is turned off and then turned back on to resume operation of the system. If the problem causing the overvoltage condition continues to persist, the shutdown circuit comprising the Zener diode 62, transistor 63 and SCR 71 once again will operate to shut the circuit down. This will occur every time the set is turned back on until the problem causing the overvoltage condition is corrected.

The circuit which has been described above operates as an effective, regulated, protected SCR power supply for a television receiver or the like. It uses a relatively small number of components to achieve this result. The rectifier devices 11, 12, 14, 15, 17, 18 and 43 all are by-passed with capacitors in known manner for preventing sudden changes in RF impedance when the diodes are switched on and off. In an actual embodiment of the circuit which has been operated, the current source 10 was the conventional 60 hertz, 110 volt household supply; and the output voltage applied on the terminal 34 was a regulated 80 volt output. The diac 24 was fired or driven into avalanche conduction when approximately 30 volts was applied across it; and when the charge on the capacitor 23 reached approximately 25 volts, the diac 24 was rendered nonconductive.

The chart below gives typical values of other components used in an operating circuit:

| Component | Value | |
|---|---|---|
| R 16 | .68 ohms | (15 watts) |
| R 20 | 27K ohms | |
| R 21 | 15K ohms | |
| R 42 | 18K ohms | |
| R 40 | 470 ohms | |
| R 35 | 10K ohms | |
| R 41 | 12K ohms | |

The above component values are intended for purposes of illustration only and in no way should be considered as limiting on the values of components which can be used in practicing the invention.

I claim:

1. A regulated power supply for producing a direct current voltage output in response to an alternating current input signal, including in combination:
    gated unidirectional conductive means operated in response to a gating signal and coupled to receive alternating current signals for producing direct current signals on an output terminal thereof;
    regulator means coupled with the output terminal of said unidirectional conductive means for regulating the magnitude of the direct current output voltage on said output terminal;
    timing control means for producing a time varying voltage;
    voltage responsive switch means coupled to sense the time varying voltage from said timing control means and coupled to supply gating signals to said gated unidirectional conductive means in response to a first predetermined voltage sensed thereby; and
    means coupled to sense current flow through said gated unidirectional conductive means and rendered operative thereby for clamping the voltage produced by said timing control means to a value less than said first predetermined voltage during the latter portion of the half-cycle of the alternating current input signal following conduction of said gated unidirectional conductive means and rendered inoperative when said gated unidirectional conductive means is rendered nonconductive upon commencement of the next succeeding half-cycle of the alternating current input signal, thereby establishing substantially the same starting voltage for said timing control means for each half-cycle of the input signal.

2. The combination according to claim 1 wherein said timing control means comprises a capacitor coupled with said output terminal through a charging path and charged at a rate proportional to the magnitude of the output voltage appearing on said output terminal, and said clamping means maintains the charge on said capacitor at a second predetermined voltage less than said first predetermined voltage.

3. The combination according to claim 2 further including supplementary means for supplying a starting charging current to said capacitor.

4. The combination according to claim 3 wherein said supplementary means comprises a supplementary rectifier circuit coupled to receive the alternating current input signal and the output of which is coupled in a charging path for said capacitor.

5. The combination according to claim 3 further including means coupled with said output terminal and responsive to the direct current voltage appearing thereon for substantially reducing the charging current supplied by said supplementary means to said capacitor in response to a third predetermined voltage appearing on said output terminal.

6. The combination according to claim 1 further including protection means coupled with said output terminal and further coupled with said timing control means for sensing the direct current voltage produced on said output terminal and responsive to voltages thereon exceeding a second predetermined voltage for preventing the voltage on said timing control means from attaining said first predetermined voltage.

7. The combination according to claim 6 wherein said protection means clamps the voltage on said timing control means to a predetermined voltage less than said first predetermined voltage.

8. The combination according to claim 1 further including a static latching switch coupled in series circuit between said timing capacitor and a point of reference potential, said static latching switch having a gate; and sensing circuit means comprising a transistor having at least an output electrode and a control electrode coupled with said output terminal and being normally nonconductive but rendered conductive in response to voltages on said output terminal exceeding a second predetermined voltage to apply a pulse on the output electrode thereof to the gate of said static latching switch to render said static latching switch conductive.

9. The combination according to claim 8 wherein said static latching switch is a silicon controlled rectifier.

10. The combination according to claim 1 wherein said gated unidirectional conductive means comprises a full wave rectifier circuit including at least first and second gated static latching switches coupled in common with said output terminal and each having a gate and each rendered conductive on opposite half-cycles of the alternating current input signal in response to gating signals applied to the gates thereof.

11. The combination according to claim 10 wherein said voltage responsive switch means comprises an avalanche breakdown device coupled in circuit between said output terminal and the gates of said static latching switches for supplying gating pulses to the gates of static latching switches upon avalanche breakdown thereof in response to said first predetermined voltage; and said timing control means comprises a capacitor coupled in a charging circuit with said output terminal.

12. The combination according to claim 11 wherein said static latching switches comprise silicon-controlled rectifiers coupled in a bridge rectifier circuit and said avalanche breakdown device comprises a diac.

13. A regulated power supply circuit for producing a direct current voltage in response to an alternating current input signal including in combination:

a full-wave bridge rectifier having first and second input terminals, to which said alternating current input signal is applied, and having first and second output terminals, said first output terminal comprising the output terminal of said regulated power supply circuit and the second output terminal being coupled with a point of reference potential, said bridge rectifier circuit including at least first and second silicon-controlled rectifiers each having control gates and each coupled between a different one of first and second input terminals and one of said output terminals;

shunt regulator circuit means coupled between said first output terminal and said point of reference potential and having a shunt regulator output terminal;

a timing capacitor coupled in a charging circuit between said shunt regulator output terminal and said point of reference potential;

a diac and a first resistor connected together at a first junction and coupled in series across said timing capacitor with said first junction coupled with the gates of said first and second silicon-controlled rectifiers;

second and third resistors coupled together at a second junction;

an auxiliary rectifier circuit having an output terminal coupled through said second and third resistors to said junction, said auxiliary rectifier circuit coupled to receive said alternating current input signal, voltage responsive shunt means having a control input terminal coupled with said first output terminal of said full-wave bridge rectifier and coupled between said second junction and said point of reference potential, said shunt means rendered conductive to reduce the current supplied to said timing capacitor by said auxiliary rectifier circuit in response to a predetermined voltage level attained on the first output terminal of said bridge rectifier.

14. The combination according to claim 13 further including overvoltage sensing means coupled to sense the voltage appearing between said first output terminal and the point of reference potential and operative to clamp the voltage on said timing capacitor to a level less than that necessary to effect avalanche breakdown of said diac, thereby terminating the application of gating pulses to the gates of said silicon-controlled rectifiers and thereby preventing the application of rectified direct current potential from said bridge rectifier to said first output terminal thereof.

15. The combination according to claim 13 wherein said bridge rectifier comprises first and second diodes and first and second silicon-controlled rectifiers, with said first and second diodes having the anodes thereof coupled in common with said second output terminal and the cathodes thereof coupled respectively with said first and second input terminals, said first and second silicon-controlled rectifiers having the cathodes thereof coupled in common with said first output terminal and the anodes thereof coupled respectively to said first and second input terminals; and said auxiliary rectifier comprises first and second diodes, the cathodes of which are coupled in common to form the output terminal thereof and the anodes of which are coupled respectively to said first and second input terminals of said bridge rectifier, whereby the first and second diodes of said auxiliary rectifier comprise a full wave rectifier circuit with the first and second diodes of said bridge rectifier such that the first and second diodes of said bridge rectifier perform a dual function in both said bridge rectifier and said auxiliary rectifier circuits.

16. The combination according to claim 13 further including means coupled to sense the current flow through said silicon controlled bridge rectifier for clamping the potential on said timing capacitor to a voltage less than the voltage required to cause breakdown of said diac, said sensing means being disabled in response to cessation of current flow through a conductive silicon-controlled rectifier in response to phase reversal of said alternating current input signal.

17. The combination according to claim 16 wherein said sensing means comprises a transistor, the collector of which is coupled with said first junction, the emitter of which is coupled with said second output terminal of said rectifier bridge, and the base thereof is coupled in circuit with said point of reference potential.

18. The combination according to claim 17 wherein said transistor is an NPN transistor and the first output terminal of said bridge rectifier comprises the positive output terminal thereof and the second output terminal of said bridge rectifier comprises the negative output terminal thereof.

19. A power supply circuit for producing a direct current voltage in response to an alternating current input signal including in combination:

a first rectifier circuit having at least one input terminal to which said alternating current input signal is applied and having at least one output terminal comprising the output terminal of said power supply circuit, said first rectifier circuit including at least one silicon controlled rectifier having a control gate and coupled between said input terminal and said output terminal;

control circuit means coupled with said output terminal and with the gate of said silicon controlled rectifier for controlling the conductivity of such rectifier in response to the direct current voltage appearing on said output terminal;

an auxiliary rectifier circuit having an output terminal coupled in circuit with the output terminal of said first rectifier circuit and having at least one input terminal coupled to receive said alternating current input signal; and voltage responsive shunt means having a control terminal coupled with said output terminal of said first rectifier circuit and coupled between the output terminal of said auxiliary rectifier and a point of reference potential, said shunt means rendered conductive to reduce the effect on said control circuit means by said auxiliary rectifier circuit in response to a predetermined voltage level attained on the output terminal of said first rectifier.

20. The combination according to claim 19 further including first and second resistors coupled together at a junction and coupled in series between the output terminal of said auxiliary rectifier circuit and the output terminal of said first rectifier circuit, and wherein said voltage responsive shunt means is coupled between said junction and said point of reference potential.

21. The combination according to claim 20 wherein said voltage responsive shunt means includes a third resistor and a transistor switch means connected in series between said junction and said point of reference potential, said transistor switch being nonconductive when alternating current power is first applied to said first rectifier circuit and said auxiliary rectifier circuit and being rendered conductive in response to a predetermined voltage level attained on the output terminal of said first rectifier circuit to reduce the current supplied by said auxiliary rectifier circuit to said control circuit means.

* * * * *